(12) United States Patent
Aizman et al.

(10) Patent No.: US 9,710,535 B2
(45) Date of Patent: Jul. 18, 2017

(54) OBJECT STORAGE SYSTEM WITH LOCAL TRANSACTION LOGS, A DISTRIBUTED NAMESPACE, AND OPTIMIZED SUPPORT FOR USER DIRECTORIES

(71) Applicant: Nexenta Systems, Inc., Santa Clara, CA (US)

(72) Inventors: Alexander Aizman, Mountain View, CA (US); Caitlin Bestler, Sunnyvale, CA (US); Robert E. Novak, Tracy, CA (US)

(73) Assignee: Nexenta Systems, Inc., Santa Clara, CA (US)

(*) Notice: Subject to any disclaimer, the term of this patent is extended or adjusted under 35 U.S.C. 154(b) by 66 days.

(21) Appl. No.: 14/820,471

(22) Filed: Aug. 6, 2015

(65) Prior Publication Data
US 2015/0347553 A1 Dec. 3, 2015

Related U.S. Application Data

(63) Continuation-in-part of application No. 14/258,791, filed on Apr. 22, 2014, now Pat. No. 9,507,812.
(Continued)

(51) Int. Cl.
*G06F 17/30* (2006.01)
*H04L 9/32* (2006.01)

(52) U.S. Cl.
CPC .. *G06F 17/30578* (2013.01); *G06F 17/30159* (2013.01); *G06F 17/30174* (2013.01);
(Continued)

(58) Field of Classification Search
CPC ......... G06F 17/30011; G06F 17/30578; G06F 17/30215; G06F 17/30221; G06F 17/30174; H04L 9/3239
See application file for complete search history.

(56) References Cited

U.S. PATENT DOCUMENTS 8,868,506 B1 * 10/2014 Bhargava .......... G06F 17/30011
707/648
9,152,642 B2 * 10/2015 Harrison .......... G06F 17/30091
(Continued)

*Primary Examiner* — Tarek Chbouki
(74) *Attorney, Agent, or Firm* — DLA Piper LLP (US)

(57) ABSTRACT

The present invention relates to object storage systems that support hierarchical directories within a namespace manifest stored as an object. The namespace manifest is stored as namespace manifest shards that are determined based on a partial key derived from the full name of the referenced version manifest in each directory entry. Each storage server maintains a local transaction log that keeps track of changes to the namespace manifest in response to put transactions. The namespace manifest can be updated after each put transaction is acknowledged, which minimizes the number of write operations required for a put transaction. Updates to the namespace manifest are batched, distributed, and processed concurrently and in parallel by the storage servers that store the corresponding shards. This reduces the latency that would otherwise exist in the object storage cluster as a result of a put transaction. Updates to namespace manifest shards optionally occur in a batch process using MapReduce techniques.

7 Claims, 16 Drawing Sheets

Related U.S. Application Data which is a continuation of application No. 13/624,593, filed on Sep. 21, 2012, now Pat. No. 8,745,095, which is a continuation-in-part of application No. 13/029,342, filed on Aug. 12, 2011, now Pat. No. 8,533,231, and a continuation-in-part of application No. 13/415,742, filed on Mar. 8, 2012, now Pat. No. 8,849,759, application No. 14/820,471, which is a continuation-in-part of application No. 14/095,839, filed on Dec. 3, 2013, now Pat. No. 9,338,019, and a continuation-in-part of application No. 14/095,843, filed on Dec. 3, 2013, now Pat. No. 9,344,287, and a continuation-in-part of application No. 14/095,848, filed on Dec. 3, 2013, now Pat. No. 9,385,874, and a continuation-in-part of application No. 14/095,855, filed on Dec. 3, 2013, now Pat. No. 9,385,875.

(60) Provisional application No. 62/040,962, filed on Aug. 22, 2014, provisional application No. 62/098,727, filed on Dec. 31, 2014.

(52) U.S. Cl.
CPC .. *G06F 17/30215* (2013.01); *G06F 17/30221* (2013.01); *H04L 9/3239* (2013.01); *H04L 2209/34* (2013.01)

(56) References Cited

U.S. PATENT DOCUMENTS

| | | |
|---|---|---|
| 2004/0028043 A1 | 2/2004 | Maveli |
| 2010/0106695 A1 | 4/2010 | Calder et al. |
| 2013/0226978 A1 | 8/2013 | Bestler et al. |
| 2014/0204940 A1 | 7/2014 | Bestler et al. |
| 2014/0304513 A1 | 10/2014 | Novak et al. |
| 2015/0127608 A1* | 5/2015 | Hsieh ............... G06F 17/30575 707/623 |
| 2015/0288754 A1* | 10/2015 | Mosko ............... H04L 67/1095 709/248 |

* cited by examiner

FIGURE 3B

"Version Manifest Exists" Entry
320

Key 321

Partial Key (Portion of Object Name)

Remainder of Object Name and UVID

Value 322

CHIT of the Version Manifest for Object

FIGURE 3C

"Sub-Directory Exists" Entry
330

Key 331

Partial Key (Portion of Object Name)

Next directory entry (No Value)

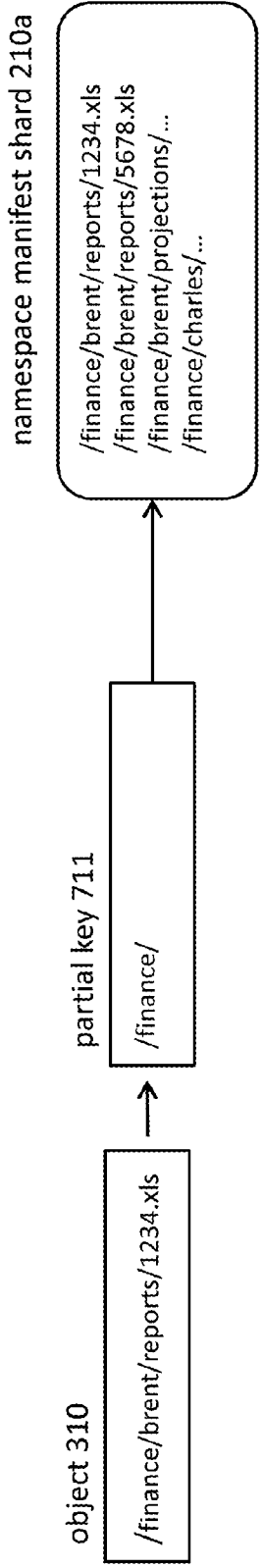
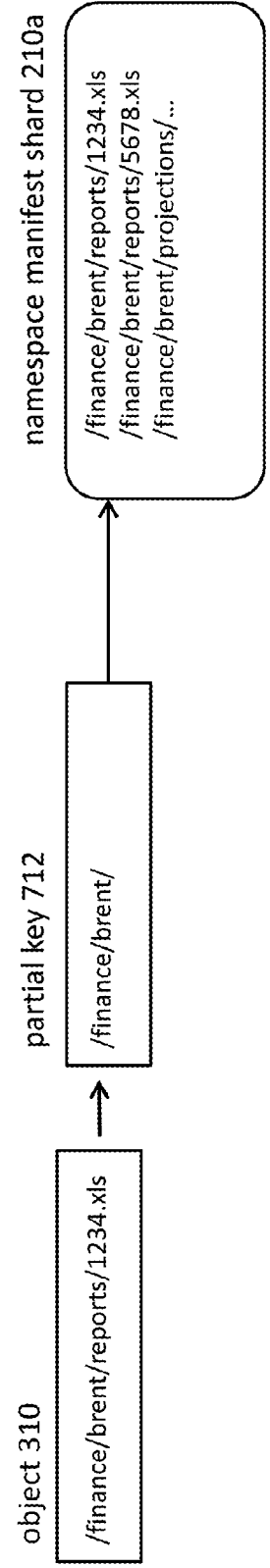
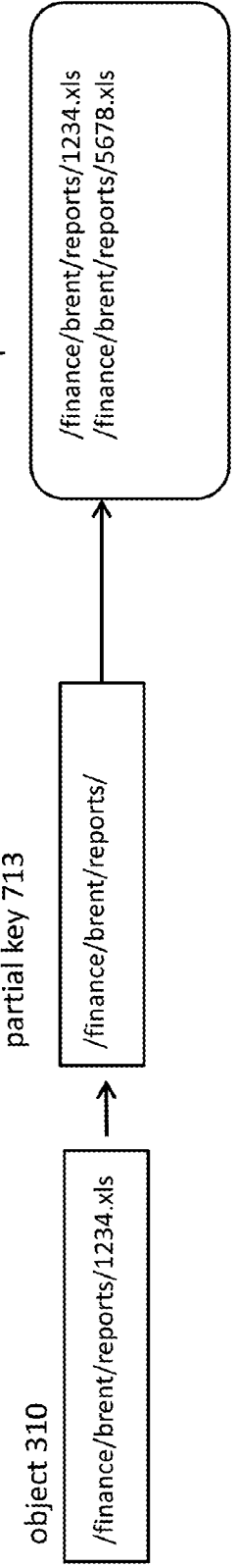
FIGURE 7A
FIGURE 7B
FIGURE 7C

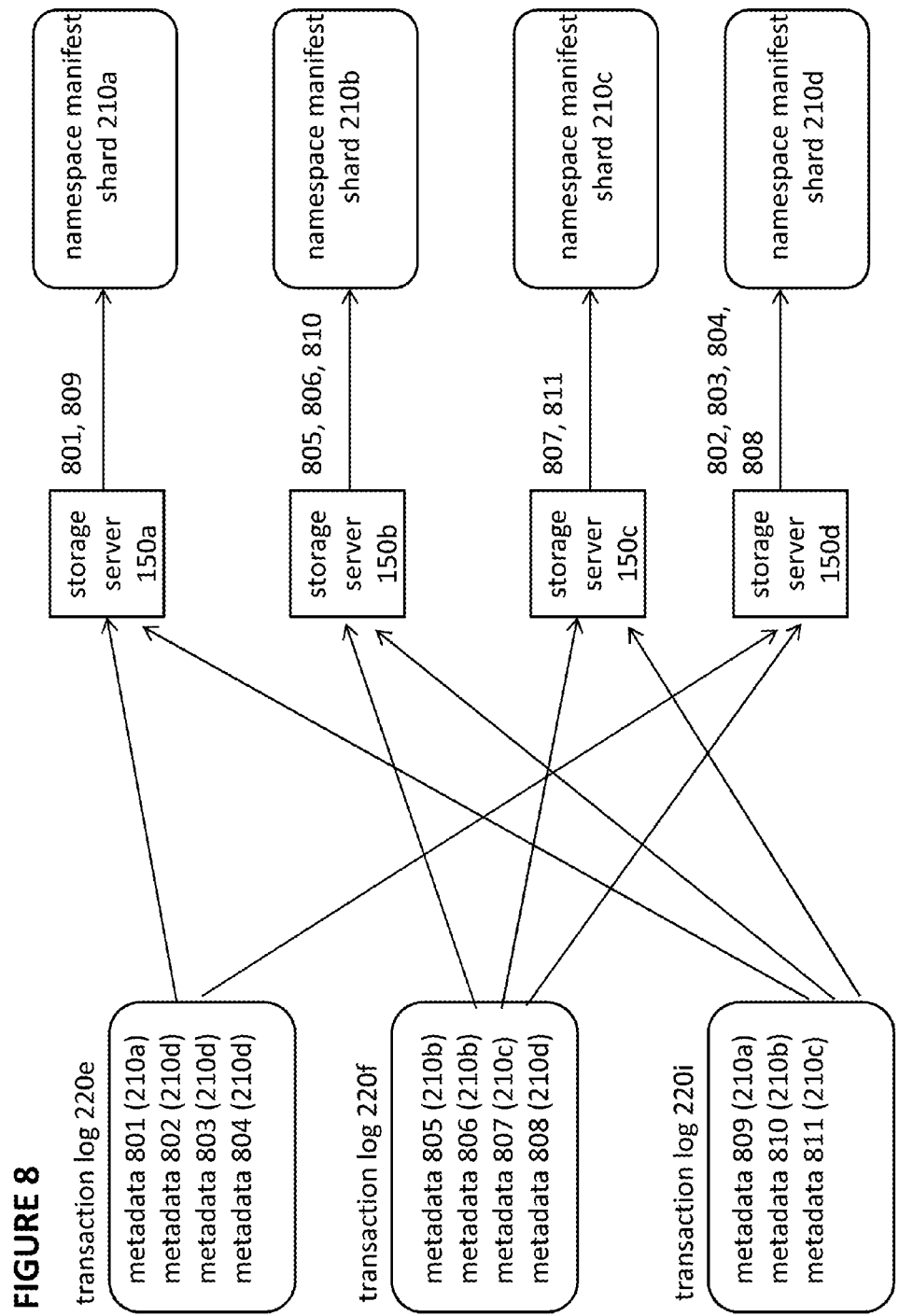

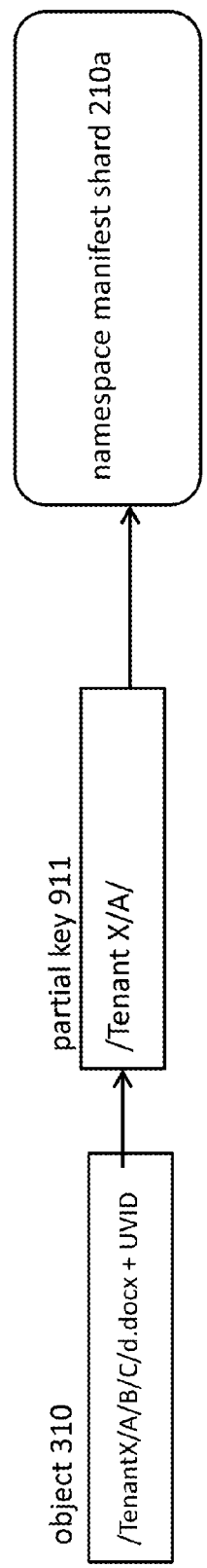

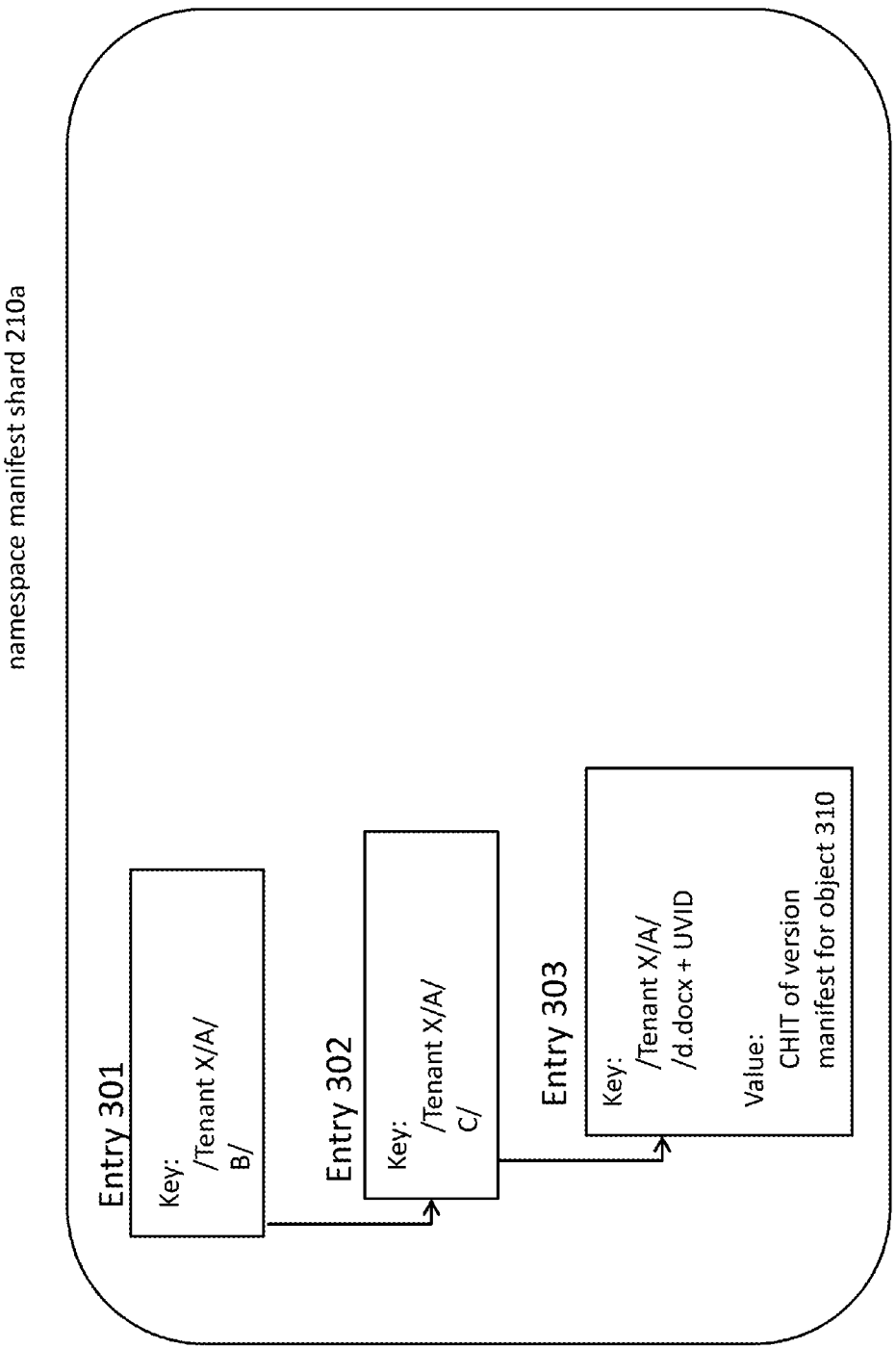
FIGURE 9B: ITERATIVE DIRECTORY

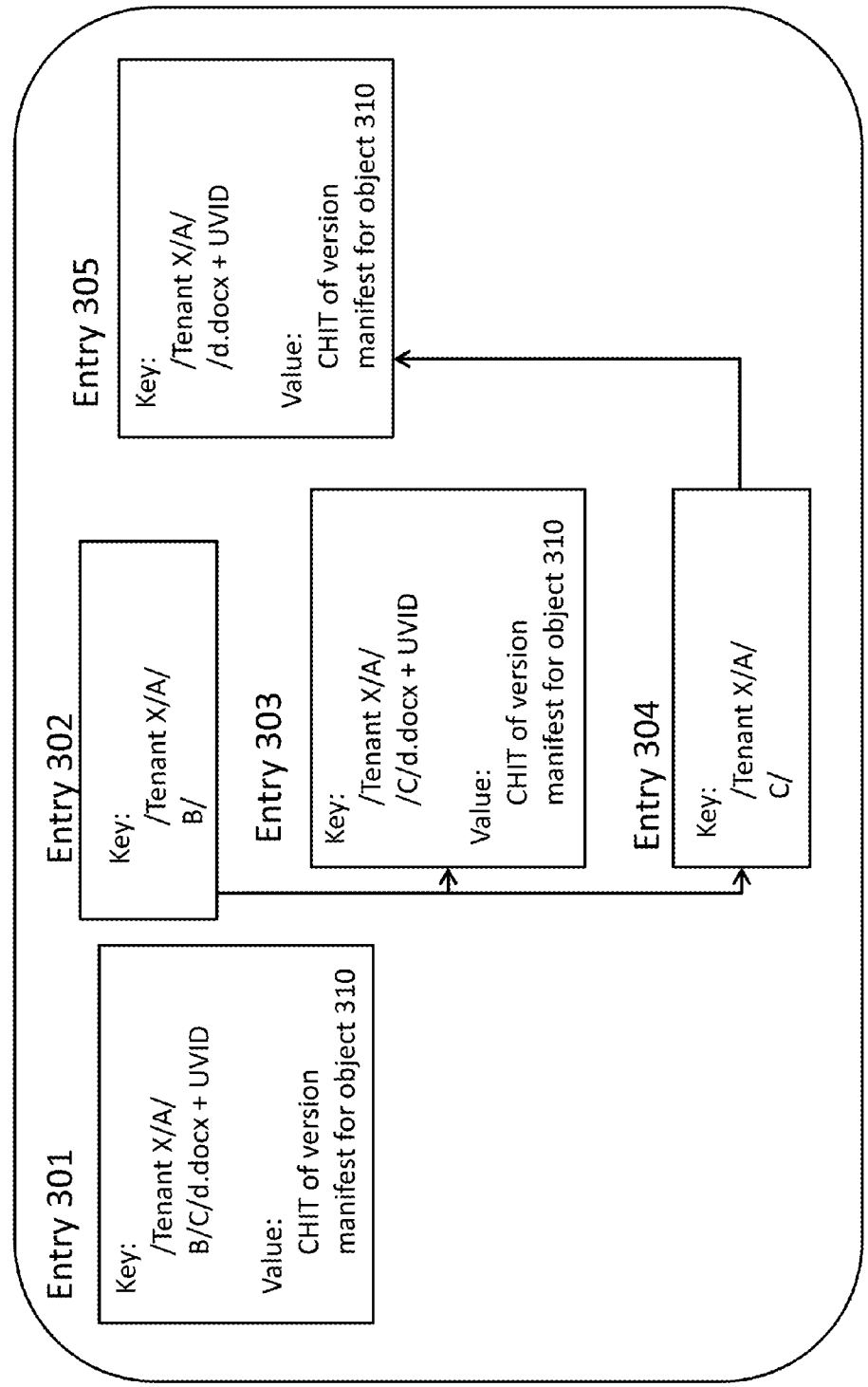
FIGURE 9C: INCLUSIVE DIRECTORY

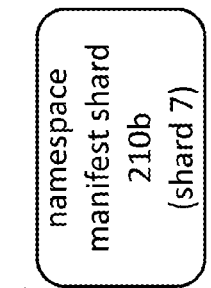
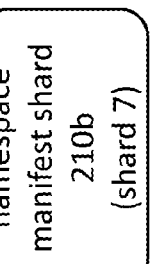
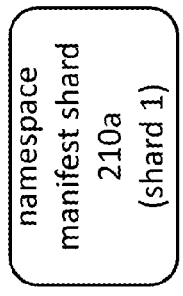
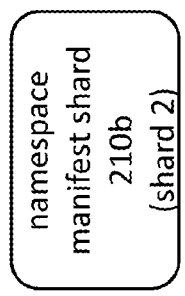
FIGURE 10B
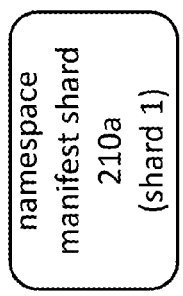
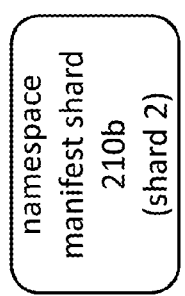
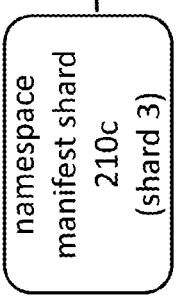
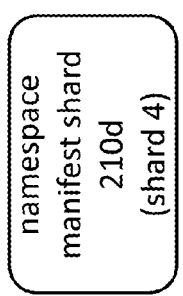
FIGURE 10A

OBJECT STORAGE SYSTEM WITH LOCAL TRANSACTION LOGS, A DISTRIBUTED NAMESPACE, AND OPTIMIZED SUPPORT FOR USER DIRECTORIES

CROSS REFERENCE TO RELATED APPLICATIONS

This application is a continuation-in-part of U.S. patent application Ser. No. 14/258,791, filed on Apr. 22, 2014 and titled "SYSTEMS AND METHODS FOR SCALABLE OBJECT STORAGE," which is incorporated by reference herein. U.S. patent application Ser. No. 14/258,791 is: a continuation of U.S. patent application Ser. No. 13/624,593, filed on Sep. 21, 2012, titled "SYSTEMS AND METHODS FOR SCALABLE OBJECT STORAGE," and issued as U.S. Pat. No. 8,745,095; a continuation-in-part of U.S. patent application Ser. No. 13/209,342, filed on Aug. 12, 2011, titled "CLOUD STORAGE SYSTEM WITH DISTRIBUTED METADATA," and issued as U.S. Pat. No. 8,533,231; and a continuation-in-part of U.S. patent application Ser. No. 13/415,742, filed on Mar. 8, 2012, titled "UNIFIED LOCAL STORAGE SUPPORTING FILE AND CLOUD OBJECT ACCESS" and issued as U.S. Pat. No. 8,849,759, all of which are incorporated by reference herein.

This application also is a continuation-in-part of U.S. patent application Ser. No. 14/095,839, which was filed on Dec. 3, 2013 and titled "SCALABLE TRANSPORT SYSTEM FOR MULTICAST REPLICATION," which is incorporated by reference herein.

This application also is a continuation-in-part of U.S. patent application Ser. No. 14/095,843, which was filed on Dec. 3, 2013 and titled "SCALABLE TRANSPORT SYSTEM FOR MULTICAST REPLICATION," which is incorporated by reference herein.

This application also is a continuation-in-part of U.S. patent application Ser. No. 14/095,848, which was filed on Dec. 3, 2013 and titled "SCALABLE TRANSPORT WITH CLIENT-CONSENSUS RENDEZVOUS," which is incorporated by reference herein.

This application also is a continuation-in-part of U.S. patent application Ser. No. 14/095,855, which was filed on Dec. 3, 2013 and titled "SCALABLE TRANSPORT WITH CLUSTER-CONSENSUS RENDEZVOUS," which is incorporated by reference herein.

This application also claims the benefit of U.S. Patent Application No. 62/040,962, which was filed on Aug. 22, 2014 and titled "SYSTEMS AND METHODS FOR MULTICAST REPLICATION BASED ERASURE ENCODING," which is incorporated by reference herein.

This application also claims the benefit of U.S. Patent Application No. 62/098,727, which was filed on Dec. 31, 2014 and titled "CLOUD COPY ON WRITE (CCOW) STORAGE SYSTEM ENHANCED AND EXTENDED TO SUPPORT POSIX FILES, ERASURE ENCODING AND BIG DATA ANALYTICS," which is incorporated by reference herein.

All of the above-listed application and patents are incorporated by reference herein and referred to collectively as the "Incorporated References."

TECHNICAL FIELD

The present invention relates to distributed object storage systems that support hierarchical user directories within its namespace. The namespace itself is stored as a distributed object. When a new object is added or updated as a result of a put transaction, metadata relating to the object's name eventually is stored in a namespace manifest shard based on the partial key derived from the full name of the object. Each storage server maintains local transaction log that keeps track of changes to the namespace manifest, the changes that reflect both object version updates and deletions. Per-server local transaction logs contribute to reduction of response time that would otherwise affect each and every put transaction. Updates to the namespace manifest shards are processed in batches using MapReduce techniques.

BACKGROUND OF THE INVENTION

Hierarchical organization of files and objects is well-known in the prior art. File systems and object storage systems often utilize nested directories (or folders), where each directory can hold other directories, files, or objects. Hierarchical organization is convenient and intuitive. In early computing systems, hierarchical organization of files was a necessity due to the size limitations of system memory. For example, it was not possible to store metadata for thousands of files at one time in system memory, but it was possible to store metadata for one level of a multi-level directory.

More recently, memory size has become significantly larger and hierarchical directories are no longer a necessity for file systems or storage servers, and some storage architectures now use a flat namespace. There are benefits to using a flat namespace instead of a hierarchical namespace. For example, a flat namespace is optimal for get operations. Web servers typically receive get requests with full URLs, rather than context dependent URLs. Web servers use side-indexes to create flat name indexes while still working with hierarchical directories, which allows looking up a long string URL is a single step, whereas navigating hierarchical directories would involve iterative reads. For example, a URL can be resolved more quickly using one vast index of 10,000 flat names as opposed to navigating three layers to one of 100 directories with 100 files each.

Nevertheless, humans still find organizing documents into folders to be quite useful. For example, URLs often refer to hierarchies of folders. Such folders typically were established by the authors of the website to organize their thinking.

What is needed is an object storage system that provides native support of hierarchical namespaces of any nesting level without changing the physical organization of an underlying object storage system to reflect the hierarchy. Reorganizing the actual storage to reflect hierarchical naming would be difficult for a distributed storage system because each layer of the hierarchical directory information would naturally end up on different storage servers. Iterating a hierarchical directory adds time even on a single storage system. Requiring extra network round trip times for each layer of a hierarchical name would add intolerable delay to resolving any object name. A desirable system would provide the benefits of a hierarchical namespace as well as the rapid execution benefits of a flat namespace.

In another aspect of the prior art, it is a general rule for network access storage services that a put transaction must not be acknowledged until the content is safe on persistent storage. The reason for this is so that the loss of a storage server that accepted the put transaction or the loss of a storage device in which the underlying data of the put transaction is to be stored does not jeopardize that transaction during the period beginning with the receipt of the put request and ending with the storage of the content on persistent storage.

Storage servers typically write new content to a sufficient number of persistent storage locations to achieve the required durability for the transaction. These writes take time and delay completion of the transaction. Maintaining a hierarchical namespace typically requires even more persistent storage writes to be performed, further delaying completion of put transactions.

What is further needed is an object storage system that stores a namespace manifest as an object that can be continuously updated and sharded while minimizing the amount of time required to perform and acknowledge a put transaction.

SUMMARY OF THE INVENTION

The present invention comprises an object storage system that provides native support of hierarchical namespaces without changing the physical organization of an underlying object storage system to reflect the hierarchy of user directories. This provides the organizational benefits of a hierarchical namespace while retaining the efficiencies of a flat object namespace.

The object storage system stores a namespace manifest as an object. The term "manifest" here is used to indicate that the namespace is a certain type (certain kind) of metadata that is generated and maintained by the storage system itself. As an object though, namespace manifest itself has (or rather, may have) its own version manifest describing a given frozen-in-time version of the object namespace.

Per this invention, the namespace manifest is a collection of key-value records that record the existence of every object version put to the storage system. The namespace manifest is stored as one or more distributed shards (parts) defined in accordance with a partial key technique described herein. Updates to the namespace manifest are batched, distributed and processed concurrently and in parallel by the storage servers that store the corresponding shards. Each storage server uses its local transaction log to store metadata that is associated with the namespace manifest and generated in response to put transactions. The present invention utilizes MapReduce technique to batch and parallelize namespace updates while retaining data integrity and consistency at all times.

BRIEF DESCRIPTION OF THE DRAWINGS

FIG. 3B depicts the structure of one types of entry that can be stored in a namespace manifest shard.

FIG. 3C depicts the structure of another type of entry that can be stored in a namespace manifest shard.

FIGS. 7A, 7B, and 7C depict examples of different partial keys applied to the name metadata for a single object version.

FIG. 8 depicts a MapReduce technique for a batch update from numerous transaction logs to numerous namespace manifest shards.

FIG. 9A depicts a partial key embodiment for namespace manifest shards.

FIG. 9B shows an iterative directory approach used in namespace manifest shards.

FIG. 9C shows an inclusive directory approach used in namespace manifest shards.

FIGS. 10A and 10B show the splitting of a namespace manifest shard.

DETAILED DESCRIPTION OF THE PREFERRED EMBODIMENTS

Figure 1:
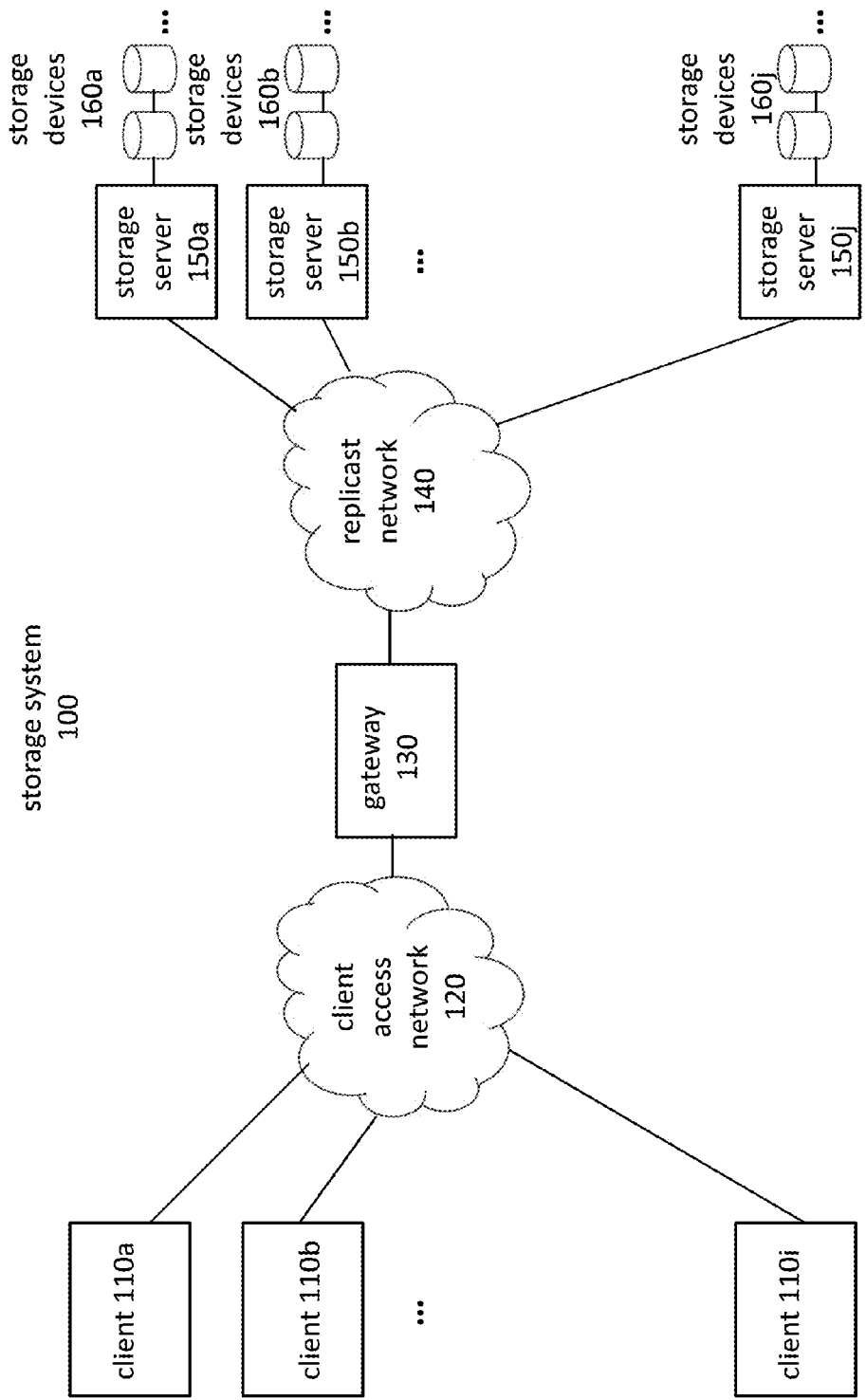
FIG. 1 depicts a storage system described in the Incorporated References.

FIG. 1 depicts storage system 100 described in the Incorporated References. Storage system 100 comprises clients 110a, 110b, . . . 110i (where i is any integer value), which access gateway 130 over client access network 120. It will be understood by one of ordinary skill in the art that there can be multiple gateways and client access networks, and that gateway 130 and client access network 120 are merely exemplary. Gateway 130 in turn accesses Replicast Network 140, which in turn accesses storage servers 150a, 150b, . . . 150j (where j is any integer value). Each of the storage servers 150a, 150b, . . . , 150j is coupled to a plurality of storage devices 160a, 160b, . . . 160j, respectively.

Overview of Embodiments

Figure 2:
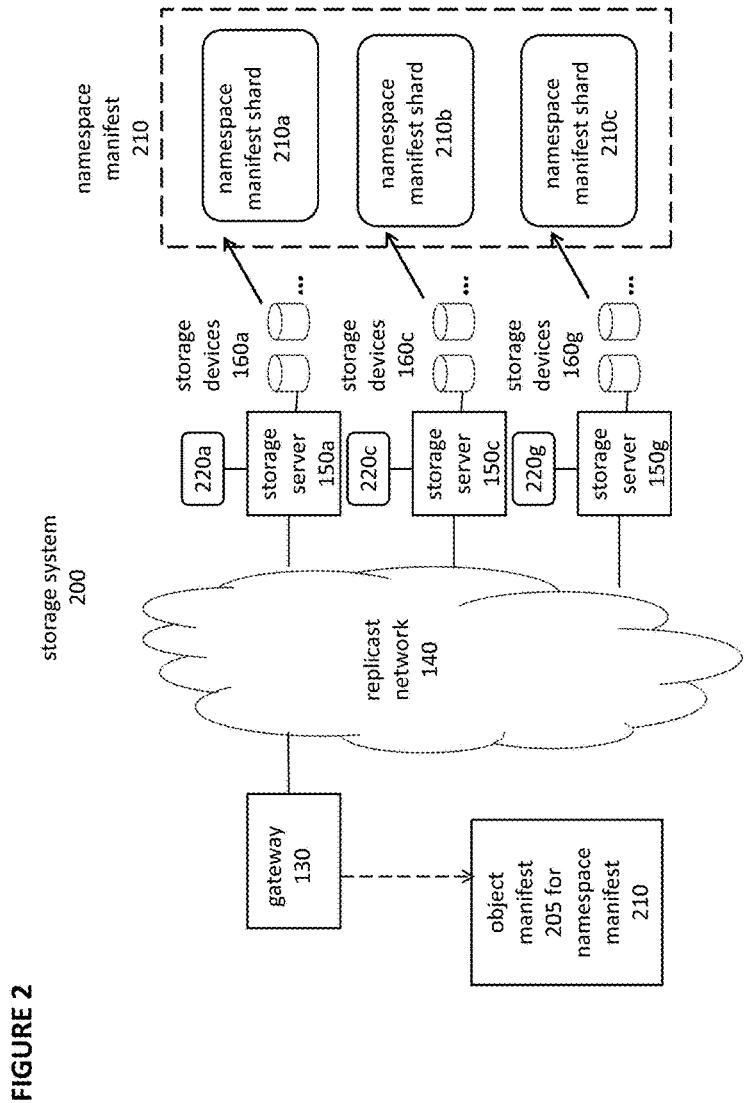
FIG. 2 depicts an embodiment of a storage system utilizing a distributed namespace manifest and local transaction logs for each storage server.

FIG. 2 depicts certain aspects of storage system 200, which is an embodiment of the invention. Storage system 200 shares many of the same architectural features as storage server 100, including the use of representative gateway 130, replicast network 140, storage servers, and a different plurality of storage devices connected to each storage server.

Storage servers 150a, 150c, and 150g here are illustrated as exemplary storage servers, and it is to be understood that the description herein applies equally to the other storage servers such as storage servers 150b, 150c, . . . 150j (not shown in FIG. 2). Similarly, storage devices 160a, 160c, and 160g are illustrated here as exemplary storage devices, and it is to be understood that the description herein applies equally to the other storage devices such as storage devices 160b, 160c, . . . , 160j (not shown in FIG. 2).

Gateway 130 can access object manifest 205 for the namespace manifest 210. Object manifest 205 for namespace manifest 210 contains information for locating namespace manifest 210, which itself is an object stored in storage system 200. In this example, namespace manifest 210 is stored as an object comprising three shards, namespace manifest shards 210a, 210b, and 210c. This is representative only, and namespace manifest 210 can be stored as one or more shards. In this example, the object has been divided into three shards and have been assigned to storage servers 150a, 150c, and 150g.

In addition, each storage server maintains a local transaction log. For example, storage server 150a stores transaction log 220a, storage server 150c stores transaction log 220c, and storage serve 150g stores transaction log 150g.

Namespace Manifest and Namespace Manifest Shards

Figure 3A:
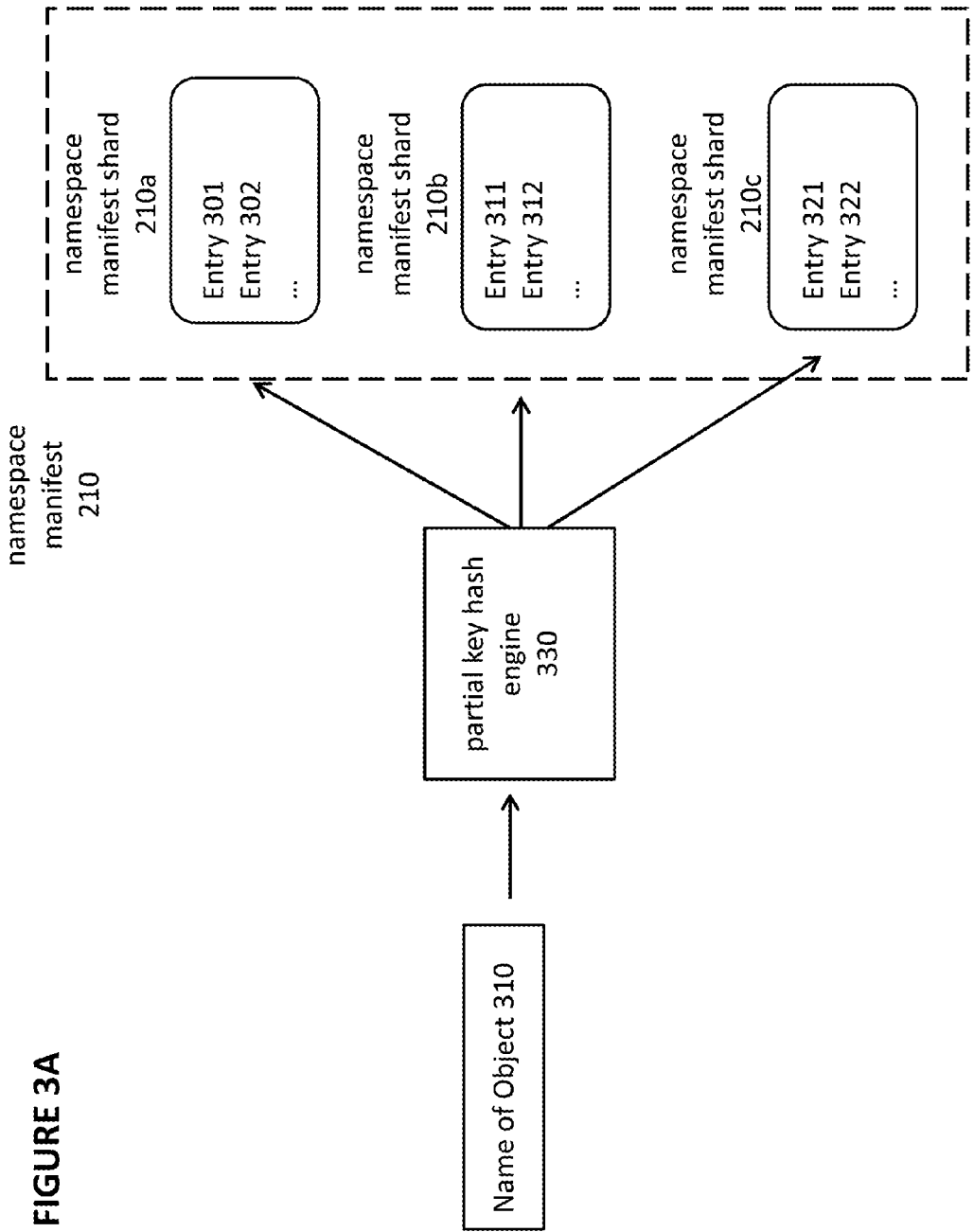
FIG. 3A depicts the relationship between an object name received in a put operation, namespace manifest shards, and the namespace manifest.

With reference to FIG. 3A, the relationship between object names and namespace manifest 210 is depicted. Exemplary name of object 310 is received, for example, as part of a put transaction. The partial key hash engine 330 runs a hash on a partial key (discussed below), and assigns the name of object 310 to a namespace manifest shard, here shown as exemplary namespace manifest shards 210a, 210b, and 210c.

Each namespace manifest shard 210, 210b, and 210c can comprise one or more entries, here shown as exemplary entries 301, 302, 311, 312, 321, and 322.

The use of multiple namespace manifest shards has numerous benefits. For example, if the system instead stored the entire contents of the namespace manifest on a single storage server, the resulting system would incur a major non-scalable performance bottleneck whenever numerous updates need to be made to the namespace manifest.

The present invention avoids this potential processing bottleneck by allowing the namespace manifest to be divided first in any end-user meaningful way, for example by running separate namespace manifests for each tenant, and then by sharding the content using a partial key. Embodiments of the present invention divide the total combined namespace of all stored object versions into separate namespaces. One typical strategy for such division is having one namespace, and therefore one namespace manifest, per each one of the tenants that use storage cluster.

Generally, division of the total namespace into separate namespaces is performed using configuration rules that are specific to embodiments. Each separate namespace manifest is then identified by the name prefix for the portion of the total namespace. The sum (that is, logical union) of separate non-overlapping namespaces will form the total namespace of all stored object versions. Similarly, controlling the namespace redundancy, including the number of namespace shards for each of the resulting separate namespace manifests, is also part of the storage cluster management configuration that is controlled by the corresponding management planes in the embodiments of the present invention.

Therefore, each name of each object 310 is sharded using the partial key hash of each record. In the preferred embodiment, the partial key is formed by a regular expression applied to the full key. However multiple alternate methods of extracting a partial key from the whole key should be obvious to those skilled in the art. In the preferred embodiment, the partial key may be constructed so that all records referencing the same object will have the same partial key and hence be assigned to the same shard. For example, under this design, if record 320a and record 320b pertain to a single object (e.g., "cat.jpg"), they will be assigned to the same shard, such as namespace manifest shard 210a.

The use of partial keys is further illustrated in FIGS. 7A, 7B, and 7C. In FIGS. 7A, 7B, and 7C, object 310 is received. In these examples, object 310 has the name "/finance/brent/reports/1234.xls." Three examples of partials keys are provided, partial keys 721, 722, and 723.

In FIG. 7A, the partial key "/finance/" is applied, which causes object 310 to be stored in namespace manifest shard 210a. In this example, other objects with names beginning with "/finance/" would be directed to namespace manifest shard 210 as well, including exemplary objects names "/finance/brent/reports/5678.xls," "/finance/brent/projections/ . . . " and "finance/Charles/ . . . ".

In FIG. 7B, the partial key "/finance/brent/" is applied, which causes object 310 to be stored in namespace manifest shard 210a. In this example, other objects with names beginning with "/finance/brent/" would be directed to namespace manifest shard 210 as well, including exemplary objects "finance/brent/reports/5678.xls," and "/finance/brent/projections/ . . . ". Notably, objects beginning with "/finance/Charles/ . . . " would not necessarily be directed to namespace manifest shard 210a, unlike in FIG. 7A.

In FIG. 7C, the partial key "/finance/brent/reports" is applied, which causes object 310 to be stored in namespace manifest shard 210a. In this example, other objects with names beginning with "/finance/brent/reports" would be directed to namespace manifest shard 210a as well, including exemplary object "finance/brent/reports/5678.xls." Notably, objects beginning with "/finance/Charles/ . . . " or "finance/brent/projections/ . . . " would not necessarily be directed to namespace manifest shard 210a, unlike in FIGS. 7A and 7B.

It is to be understood that partial keys 721, 722, and 723 are merely exemplary and that partial keys can be designed to correspond to any level within a directory hierarchy.

With reference now to FIGS. 3B and 3C, the structure of two possible entries in a namespace manifest shard are depicted. These entries can be used, for example, as entries 301, 302, 311, 312, 321, and 322 in FIG. 3A.

FIG. 3B depicts a "Version Manifest Exists" entry 320, which is used to store an object name (as opposed to a directory that in turn contains the object name). Object name entry 320 comprises key 321, which comprises the partial key and the remainder of the object name and the UVID. In the preferred embodiment, the partial key is demarcated from the remainder of the object name and the UVID using a separator such as "|" and "\" rather than "/" (which is used to indicate a change in directory level). The value 322 associated with key 321 is the CHIT of the version manifest for the object 310, which is used to store or retrieve the underlying data for object 310.

FIG. 3C depicts "Sub-Directory Exists" entry 330. Sub-directory entry 330 comprises key 331, which comprises the partial key and the next directory entry.

For example, if object 310 is named "/Tenant/A/B/C/d.docx," the partial key could be "/Tenant/A/", and the next directory entry would be "B/". No value is stored for key 331.

Delayed Revisions to Namespace Manifest in Response to Put Transaction

Figure 4A:
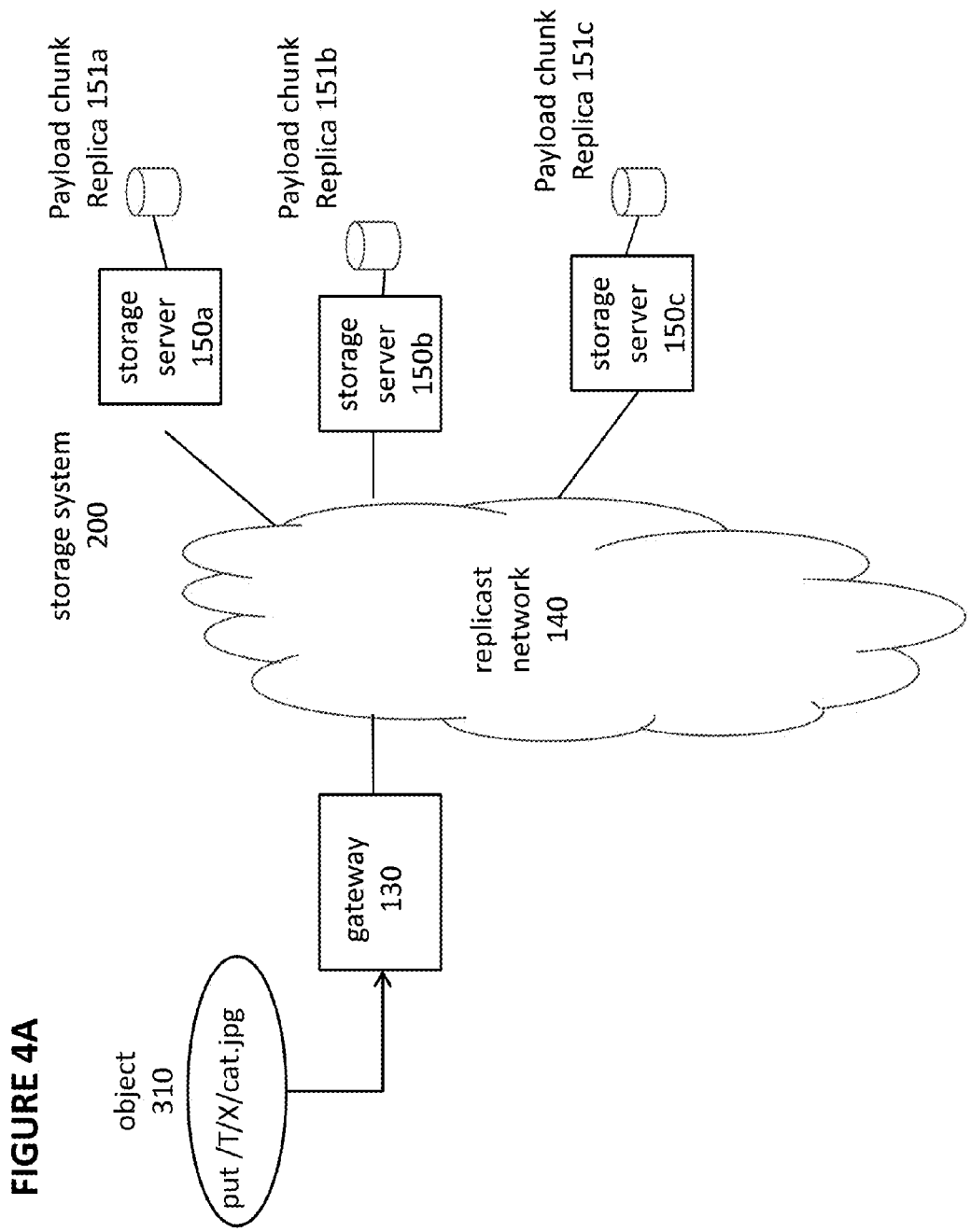
FIGS. 4A and 4B depict various phases of a put transaction in the storage system of FIG. 2.
Figure 4B:
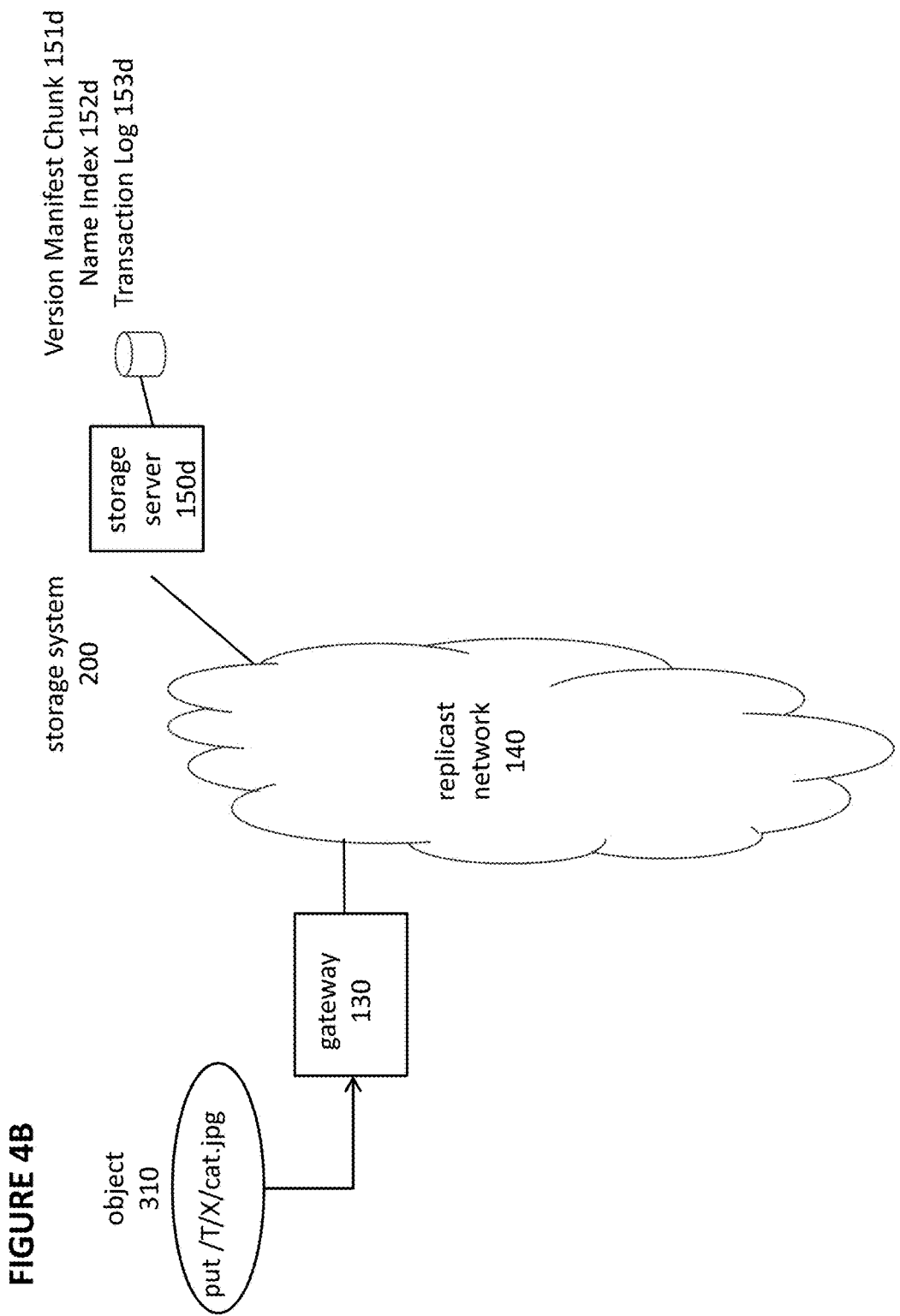

With reference to FIGS. 4A and 4B, an exemplary instruction is provided by a client, such as client 110a, to gateway 130. Here, the instruction is "put /T/S/cat.jpg," which is an instruction to store the object 310 with the name "/T/S/cat.jpg."

FIG. 4A depicts the first phase of the put transaction. Gateway 130 communicates this request over replicast network 140 as described in the Incorporated References. In this example, the payload of object 310 is stored as payload chunk replicas 151a, 151b, and 151c by storage servers 150a, 150b, and 150c, respectively, as discussed in the Incorporated References. Each storage server also stored intermediate manifests (not shown). Notably, each of the storage servers 150a, 150b, and 150c can acknowledge the storage of its payload chunk replica (151a, 151b and 151c) after it is created.

FIG. 4B depicts the second phase of the put transaction. In this example the version manifest for object 310 is to be stored by storage server 150d (as well as by other storage servers in a redundant manner). In response to this request, storage server 150d will write version manifest chunk 151 and update name index 152d for the names chunk if the new version manifest represents a more current version of the object. The existence of the version manifest for object 310 is recorded in transaction log 153d before the put transaction is acknowledged by storage servers 150a, 150b, and 150c (discussed previously with reference to FIG. 4A). This entry in the Transaction Log will be asynchronously processed at a later time. Notably, at this juncture, namespace manifest shards are not updated to reflect the put transaction involving object 310.

Figure 5:
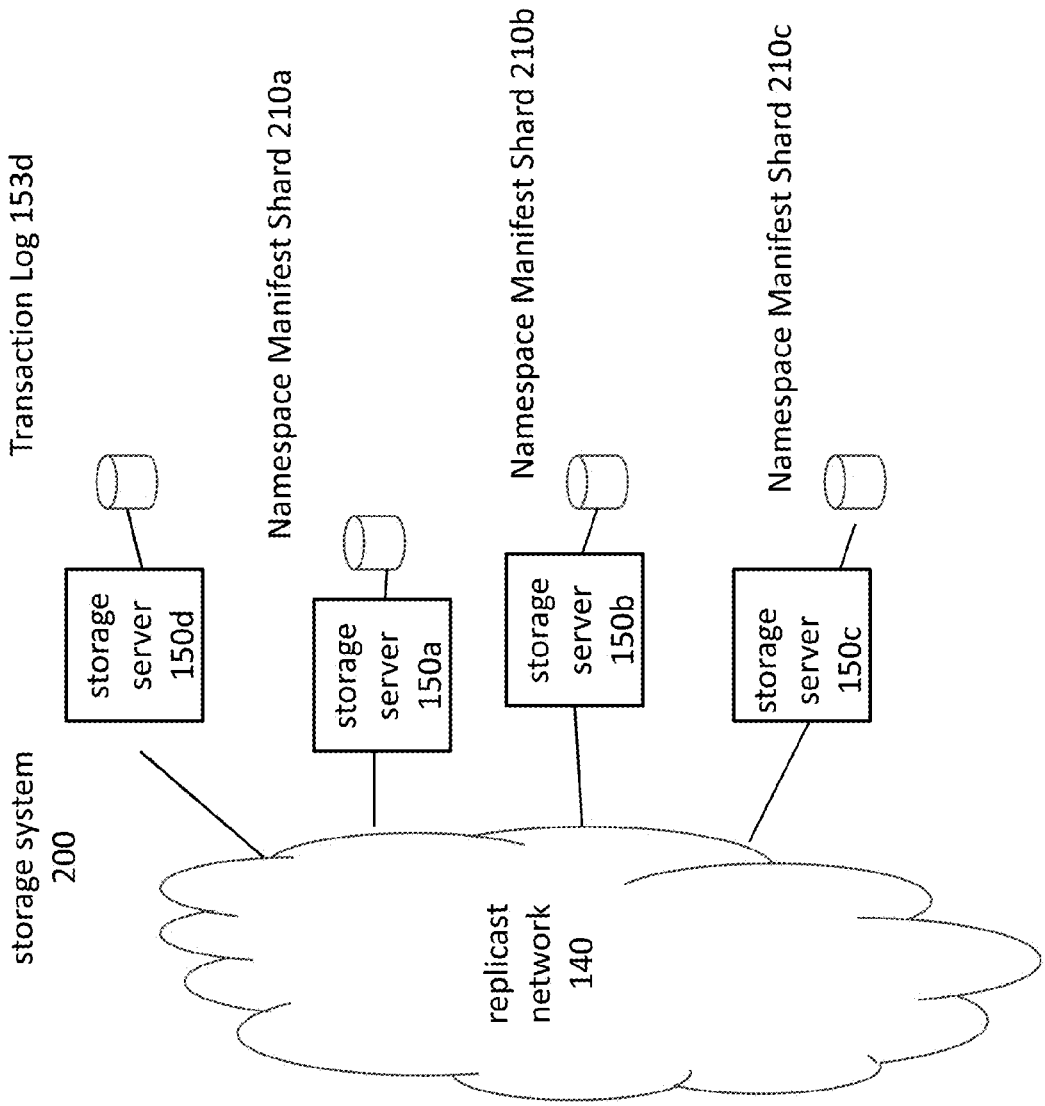
FIG. 5 depicts a delayed update of the namespace manifest following the put transaction of FIGS. 4A and 4B.

FIG. 5 illustrates a phase that occurs after the put transaction for object 310 (discussed above with reference to FIGS. 4A and 4B) has been completed. It is the "Map" phase of a MapReduce process. The entry in transaction log 153d reflecting the local creation of a version manifest 151d for object 310 are mapped to updates to one or more shards of the enclosing namespace manifest 210. Here, three shards exist, and the updates are made to namespace manifest shards 210a, 210b, and 210c.

The updating of FIG. 5 can occur during an "idle" period when storage server 150a and/or gateway 130 are not otherwise occupied. This eliminates latency associated with the put action of object 310 by at least one write cycle, which speeds up every put transaction and is a tremendous advantage of the embodiments. Optionally, the updating can occur in a batch process whereby a plurality of updates are made to namespace manifest 210 to reflect changes made by a plurality of different put transactions or other transactions, which increases the efficiency of the system even further. The merging of updates can even be deferred until there is a query for records in the specific shard. This would of course add latency to the query operation, but typically background operations would complete the merge operation before the first query operation anyway.

Version Manifests and Chunk Manifests

Figure 6:
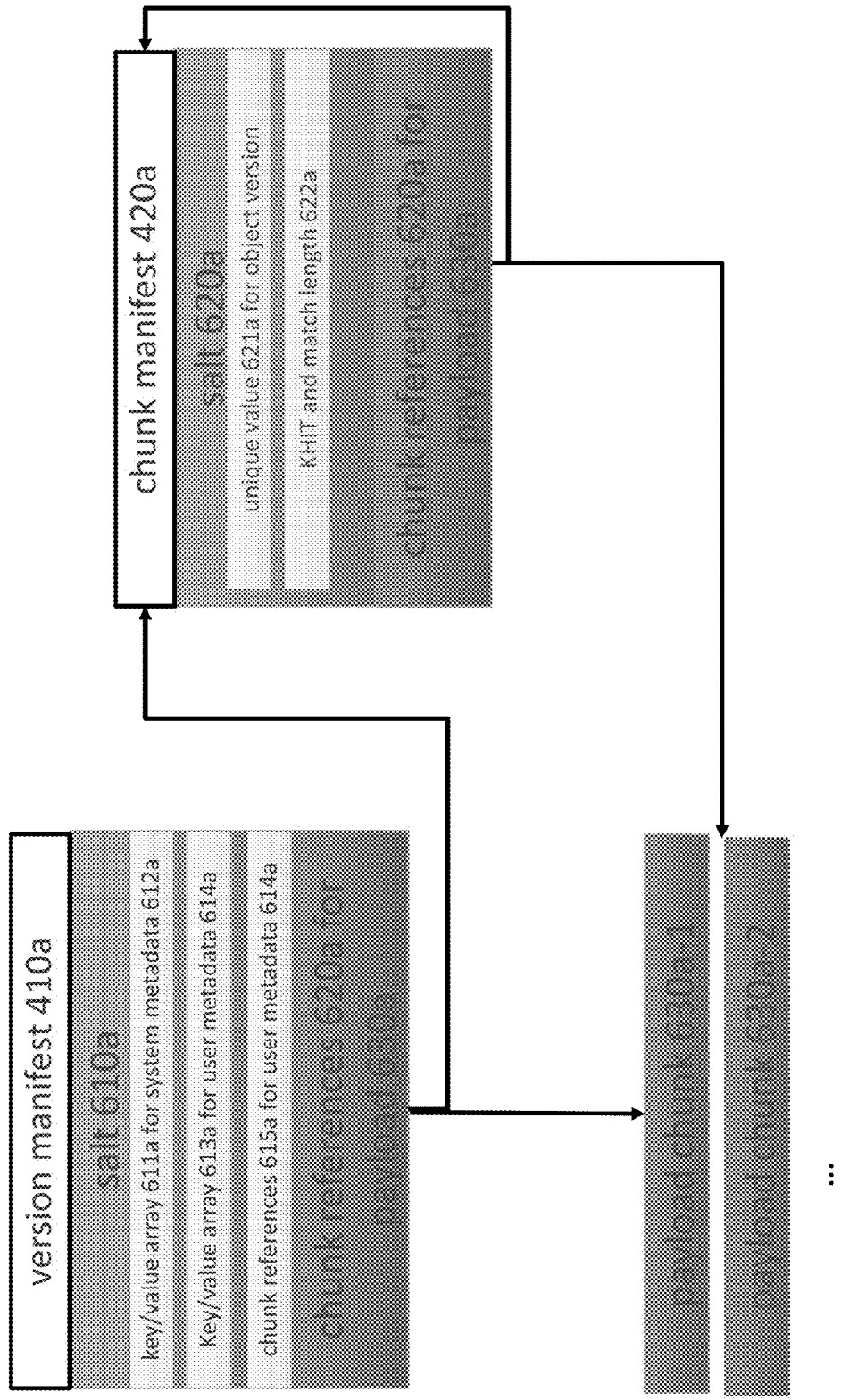
FIG. 6 depicts the structures of an exemplary version manifest, chunk manifest, and payload chunks used by the embodiments.

With reference to FIG. 6, additional detail will now be presented regarding version manifests and chunk manifests. In the present invention, object 310 has a name (e.g., "cat.jpg"). A version manifest, such as version manifest 410a, exists for each version of object 310.

FIG. 6 depicts version manifest 410a, chunk manifest 420a, and payload chunks 630a-1, 630a-2, . . . , 630a-k (where k is an integer), which together comprise the data portion of object 310.

Each manifest, such as namespace manifest 210, version manifest 410a, and chunk manifest 420a, optionally comprises a salt and an array of chunk references.

For version manifest 410a, the salt 610a comprises:
A key/value array 611a of name=value pairs for the system metadata 612a. The system metadata 612a must include key/value name pairs that uniquely identify the object version for object 310.
Additional key/value entries 613a and/or chunk references 615a for additional user metadata 614a. User metadata 614a optionally may reference a content manifest holding metadata.

Version manifest 410a also comprises chunk references 620a for payload 630a. Each of the chunk references 620a is associated with one the payload chunks 630a-1, . . . 630a-k. In the alternative, chunk reference 620a may specify chunk manifest 420a, which ultimately references payload chunk 630a-1, . . . 630a-k.

For chunk manifest 420a, the salt 620a comprises:
A unique value 621a for the object version being created, such as the transaction ID required for each transaction, as disclosed in the Incorporated References.
The KHIT and match length 622a that were used to select this chunk manifest 330a.

Chunk manifest 420a also comprises chunk references 620a for payload 630a. In the alternative, chunk manifest 420a may reference other chunk/content manifests, which in turn directly reference payload 630a or indirectly reference payload 630a through one or more other levels of chunk/content manifests. Each of the chunk references 620a is associated with one the payload chunks 630a-1, . . . 630a-k.

Chunk references 620a may be indexed either by the logical offset and length, or by a hash shard of the key name (the key hash identifying token or KHIT). The reference supplies a base value and the number of bits that an actual hash of a desired key value must match for this chunk reference to be relevant. The chunk reference then includes either inline content or a content hash identifying token (CHIT) referencing either a sub-manifest or a payload chunk.

Namespace manifest 210 is a distributed versioned object that references version manifests, such as version manifest 410a, created within the namespace. Namespace manifest 210 can cover all objects in the cluster or can be maintained for any subset of the cluster. For example, in the preferred embodiments, the default configuration tracks a namespace manifest for each distinct tenant that uses the storage cluster.

Flexibility of Data Payloads within the Embodiments

The present embodiments generalize the concepts from the Incorporated References regarding version manifest 410a and chunk manifest 420a. Specifically, the present embodiments support layering of any form of data via manifests. The Incorporated References disclose layering only for chunk manifest 420a and the user of byte-array payload. By contrast, the present embodiments support two additional forms of data beyond byte-array payloads:
Key/value records, where each record is uniquely identified by a variable length full key that yields a variable length value.
Line oriented text, where a relative line number identifies each line-feed separated text line. The number assigned to the first line in an object version is implementation dependent but would typically be either 0 or 1.

The line-array and byte-array forms can be viewed as being key/value data as well. They have implicit keys that are not part of the payload. Being implicit, these keys are neither transferred nor fingerprinted. For line oriented payload, the implicit key is the line number. For byte-array payload, a record can be formed from any offset within the object and specified for any length up to the remaining length of the object version.

Further, version manifest 410a encodes both system and user metadata as key/value records.

This generalization of the manifest format allows the manifests for an object version to encode more key/value metadata than would have possibly fit in a single chunk.

Hierarchical Directories

In these embodiments, each namespace manifest shard can store one or more directory entries, with each directory entry corresponding to the name of an object. The set of directory entries for each namespace manifest shard corresponds to what would have been a classic POSIX hierarchical directory. There are two typical strategies, iterative and inclusive, that may be employed; each one of this strategies may be configured as a system default in the embodiments.

In the iterative directory approach, a namespace manifest shard includes only the entries that would have been directly included in POSIX hierarchical directory. A sub-directory is mentioned by name, but the content under that sub-directory is not included here. Instead, the accessing process must iteratively find the entries for each named sub-directory.

FIG. 9A depicts an example for both approaches. In this example, object 310 has the name "/TenantX/A/B/C/d.docx," and the partial key 921 ("/TenantX/A/") is applied to store the name of object 310 in namespace manifest shard 210a. Here, object 310 is stored in namespace manifest shard 210a in conjunction with a put transaction for object 310.

FIG. 9B shows the entries stored in namespace manifest shard 210a under the iterative directory approach. Under this approach, entry 301 is created as a "Sub-Directory Exists" entry 330 and indicates the existence of sub-directory /B. Entry 301 is associated with entry 302, which is created as a "Sub-Directory Exists" entry 330) and indicates the existence of sub-directory /C. Entry 302 is associated with entry 303, which is created as a "Version Manifest Exists" entry 320 and lists object 310 as "d.docx+UVID".

FIG. 9C shows the entries stored in namespace manifest shard 210a under the inclusive directory approach. In the inclusive directory approach, all version manifests within the hierarchy are included, including content under each sub-directory. Entry 301 is created as a "Version Manifest Exists" entry 320 and lists the name B/C/d.docx+UVID. Entry 302 is created as a "Sub-Directory Exists" entry 330 and lists sub-directory B/. Entry 302 is associated with entries 303 and 304. Entry 303 is created as a "Sub-Directory Exists" entry 330 and lists /C.d.docx+UVID. Entry 304 is created as a "Sub-Directory Exists" entry 330 and lists directory C/, Entry 304 is associated with Entry 305, which is created as a "Version Manifest Exists" entry 320 and lists the name d.docx+UVID. This option optimizes searches based on non-terminal directories but requires more entries in the namespace manifest. As will be apparent once the updating algorithm is explained, there will typically be very few additional network frames required to support this option.

The referencing directory is the partial key, ensuring that unless there are too many records with that partial key that they will all be in the same shard. There are entries for each referencing directory combined with:

Each sub-directory relative to the referencing directory.

And each version manifest for an object that would be placed directly within the referencing directory, or with the inclusive option all version manifests that would be within this referencing directory or its sub-directories.

Gateway 130 (e.g., the Putget Broker) will need to search for non-current versions in the namespace manifest 210. In the Incorporated References, the Putget Broker would find the desired version by getting a version list for the object. The present embodiments improves upon that embodiment by optimizing for finding the current version and performing asynchronous updates of a common sharded namespace manifest 210 instead of performing synchronous updates of version lists for each object.

With this enhancement, the number of writes required before a put transaction can be acknowledged is reduced by one, as discussed above with reference to FIG. 5. This is a major performance improvement for typical storage clusters because most storage clusters have a high peak to average ratio. The cluster is provisioned to meet the peak demand, leaving vast resources available off-peak. Shifting work from the pre-acknowledgment critical path to background processing is a major performance optimization achieved at the very minor cost of doing slightly more work when seeking to access old versions. Every put transaction benefits from this change, while only an extremely small portion of the get transaction results in additional work being performed.

Queries to find all objects "inside" of a hierarchical directory will also be optimized. This is generally a more common operation than listing non-current versions. Browsing current versions in the order implied by classic hierarchical directories is a relatively common operation. Some user access applications, such as Cyberduck, routinely collect information about the "current directory."

Distributing Directory Information to the Namespace Manifest

The namespace manifest 210 is a system object with versions containing directory entries that are automatically propagated by the object cluster as a result of creating or expunging version manifests. The ultimate objective of the namespace manifest 210 is to support a variety of lookup operations including finding non-current (not the most recent) versions of each object. Another lookup example includes listing of all or some objects that are conceptually within a given hierarchical naming scope, that is, in a given user directory and, optionally, its sub-directories. In the Incorporated References, this was accomplished by creating list objects to track the versions for each object and the list of all objects created within an outermost container. These methods are valid, but require new versions of the lists to be created before a put transaction is acknowledged. These additional writes increase the time required to complete each transaction.

The embodiment of FIG. 5 will now be described in greater detail. Transaction logs 220a . . . 220g contain entries recording the creation or expunging of version manifests, such as version manifest 410a. Namespace manifest 210 is maintained as follows.

As each entry in a transaction log is processed, the changes to version manifests are generated as new edits for the namespace manifest 210.

The version manifest referenced in the transaction log is parsed as follows: The fully qualified object name found within the version manifest's metadata is parsed into a tenant name, one or more enclosing directories (typically based upon configurable directory separator character such as the ubiquitous forward slash ("/") character), and a final relative name for the object.

Records are generated for each enclosing directory referencing the immediate name enclosed within in of the next directory, or of the final relative name. For the iterative option, this entry only specifies the relative name of the immediate sub-directory. For the inclusive option the full version manifest relative to this directory is specified.

With the iterative option the namespace manifest records are comprised of:

The enclosing path name: A concatenation of the tenant name and zero or more enclosing directories.

The next sub-directory name or the object name and unique identifier. If the latter, the version manifest content hash identifier (CHIT) is also included.

With the inclusive option the namespace manifest records are comprised of:

The enclosing path name: a concatenation of the tenant name and zero or more enclosing directories.

The remaining path name: A concatenation of the remaining directory names, the final object name and its unique version identifier.

The version manifest content hash identifier (CHIT).

A record is generated for the version manifest that fully identifies the tenant, the name within the context of the tenant and Unique Version ID (UVID) of the version manifest as found within the version manifest's metadata.

These records are accumulated for each namespace manifest shard 210a, 210b, 210c. The namespace manifest is sharded based on the key hash of the fully qualified name of the record's enclosing directory name. Note that the records generated for the hierarchy of enclosing directories for a typical object name will typically be dispatched to multiple shards.

Once a batch has accumulated sufficient transactions and/or time it is multicast to the Negotiating Group that manages the specific namespace manifest shard.

At each receiving storage server the namespace manifest shard is updated to a new chunk by applying a merge/sort of the new directory entry records to be inserted/deleted and the existing chunk to create a new chunk. Note that an implementation is free to defer application of delta transactions until convenient or there has been a request to get to shard.

In many cases the new record is redundant, especially for the enclosing hierarchy. If the chunk is unchanged then no further action is required. When there are new chunk contents then the index entry for the namespace manifest shard is updated with the new chunk's CHIT.

Note that the root version manifest for a namespace manifest does not need to be centrally stored on any specific, set of servers. Once a configuration object creates the sharding plan for a specific namespace manifest the current version of each shard can be referenced without prior knowledge of its CHIT.

Further note that each namespace manifest shard may be stored by any subset of the selected Negotiating Group as long as there are at least a configured number of replicas. When a storage server accepts an update from a source it will be able to detect missing batches, and request that they be retransmitted.

Continuous Update Option

The preferred implementation does not automatically create a version manifest for each revision of a namespace manifest. All updates are distributed to the current version of the target namespace manifest shard. The current set of records, or any identifiable subset, may be copied to a different object to create a frozen enumeration of the namespace or a subset thereof. Conventional objects are updated in discrete transactions originated from a single gateway server, resulting in a single version manifest. The updates to a namespace manifest arise on an ongoing basis and are not naturally tied to any aggregate transaction. Therefore, use of an implicit version manifest is preferable, with the creation of a specifically identified (frozen-in-time) version manifest of the namespace deferred until it is specifically needed.

Distributing Back-References Using MapReduce

As previously disclosed in the Incorporated References, a multicast-enabled object cluster must track the class-of-storage needs for each unnamed chunk as the union of the requirements for the referencing manifests. In the Incorporated References, this was accomplished with lazy eventual updates of verified back-references, with speculative back-references holding the claim on the unnamed chunk until the verified back-reference is distributed via eventual back-reference verification transactions.

While these transactions are lazy, and do not have to be completed during the critical put transaction, there is still one deferred transaction for each real-time transaction. This is undesirable, and may create performance bottlenecks for storage applications that produce new put transactions on a continuous or near-continuous basis. Data capture applications, such as security surveillance systems, are an example of a storage application where this could be a bottleneck.

The present invention relies upon the transaction log entries recording new version manifests (or expunging them) to drive a series of update batches which will eventually replace speculative back-references with verified back-references while avoiding the need to do one deferred transaction for every foreground transaction performed. The transactions records updating back-references are the mapped results of the Map phase of this MapReduce process.

The present invention extends the process of reading the per-device transaction log entries. It is extended so that when reading a Manifest creation transaction log entry, this process will map the transaction log entry referenced CHIT to a set of verified back-references, each containing the referencing manifest's CHIT and the referenced CHIT, and will append each entry to a pending batch for the Negotiating Group of the referenced CHIT.

These batches also contain the following identifying fields: the unique device identifier that is generating the back-references, the targeted Negotiating Group, a sequence number for the batch (which is the nth batch from this device for this Negotiating Group), and a timestamp indicating the time when the batch was created.

The resulting batch is distributed to the Negotiating Group as previously described for MapReduce jobs.

When receiving these batches the following steps apply: If this is not the expected sequence number, a request to retransmit the missing blobs is sent to the source. When it is in order, the verified back-references are applied as disclosed in the original application. After the batch is processed the timestamp is noted. When all active nodes have provided updates through a given time then Speculative Back-References with an earlier expiration will become eligible for deletion.

Exemplary batch updates are shown in FIG. 8. It will be seen that the embodiments optionally utilize a MapReduce technique that further increases the efficiency of updates to the namespace manifest shards. In this example, the various translation logs can accumulate revisions to various namespace manifest shards and then update the namespace manifest shards in a batch process.

In this example, transaction log 220e associated with storage serve 150e (not shown) has accumulated entries comprising metadata 801 (which relates to a change to be made to namespace manifest shard 210a), metadata 802 (which relates to a change to be made to namespace manifest shard 210d), metadata 803 (which relates to a change to be made to namespace manifest shard 210d), and metadata 804 (which relates to a change to be made to namespace manifest shard 210d).

Transaction log 220f associated with storage serve 150f (not shown) has accumulated entries comprising metadata 805 (which relates to a change to be made to namespace manifest shard 210b), metadata 806 (which relates to a change to be made to namespace manifest shard 210b), metadata 807 (which relates to a change to be made to namespace manifest shard 210*c*), and metadata 808 (which relates to a change to be made to namespace manifest shard 210*d*).

Transaction log 220*i* associated with storage server 150*i* (not shown) has accumulated entries comprising metadata 809 (which relates to a change to be made to namespace manifest shard 210*a*), metadata 810 (which relates to a change to be made to namespace manifest shard 210*b*), and metadata 811 (which relates to a change to be made to namespace manifest shard 210*c*).

During the batch update process, metadata is transmitted to the appropriate storage server. Thus, metadata 801 and 809 are transmitted to storage server 150*a*; metadata 805, 806 and 810 are transmitted to storage server 150*b*; metadata 807, and 811 are transmitted to storage server 150*c*; and metadata 802, 803, 804, and 808 are transmitted to storage server 150*d*.

Each storage server then updates the namespace manifest shard that is stored within its storage devices. Thus, storage server 150*a* stores metadata 801 and 809 in namespace manifest shard 210*a*; storage server 150*b* stores metadata 805, 806, and 810 in namespace manifest shard 210*b*; storage server 150*c* stores metadata 807 and 811 in namespace manifest shard 210*c*; and storage server 150*d* stores metadata 802, 803, 804, and 808 in namespace manifest shard 210*d*. One of ordinary skill in the art will appreciate that the map reduce technique of FIG. 8 results in tremendous efficiency for put operations, as each namespace manifest shard will be updated in a batch process during a time when the system is idle.

Processing of a Batch for a Split Negotiating Group

Because distribution of batches is asynchronous, it is possible to receive a batch for a Negotiating Group that has been split. The receiver must split the batch, and distribute the half no longer for itself to the new negotiating group. This step is applicable for both the Namespace Manifest and back-reference processing.

Transaction Log KVTs

The locally stored Transaction Log KVTs should be understood to be part of a single distributed object with key-value tuples. Each Key-Value tuple has a key comprised of a timestamp and a Device ID. The Value is the Transaction Log Entry. Any two subsets of the Transaction Log KVTs may be merged to form a new equally valid subset of the full set of Transaction Log KVTs.

In many implementations the original KVT capturing Transaction Log Entries on a specific device may optimize storage of Transaction Log Entries by omitting the Device ID and/or compressing the timestamp. Such optimizations do not prevent the full logical Transaction Entry from being recovered before merging entries across devices.

Speculative Hold

Figure 12:
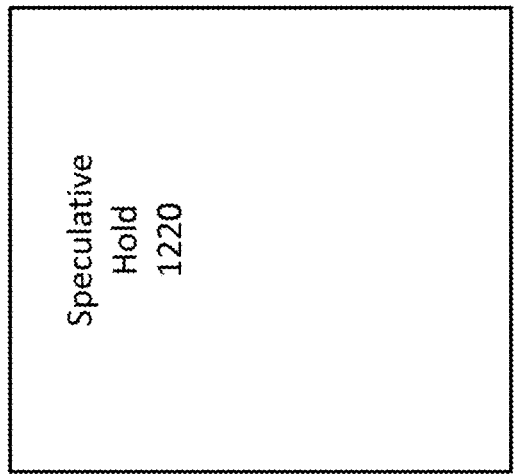
FIG. 12 illustrates a speculative hold field within a back-reference KVT for a chunk.

With reference to FIG. 12, a Speculative Hold 1220 is a field within the Back-Reference KVT 1210 for a Chunk which holds a single timestamp "hold" on the chunk, preventing expunging of this chunk until at least the timestamp specified.

The Speculative Hold 1220 is extended on any Unnamed Put. This replaces creating a Speculative Back-Reference as disclosed previously. The Speculative Hold 1220 is never removed, however it becomes irrelevant once the time specified has passed. A chunk cannot be expunged before its current Speculative Hold 1220 time or when there are no Verified Back References for it. Creating a Verified Back Reference does not remove the Speculative Hold 1220 in the way that the previously disclosed algorithms potentially removed a Speculative Back-Reference whenever a Verified Back-referenced was added.

The use of a single Speculative Hold 1220 compares with keeping multiple Speculative Back-references in the following ways:

A Speculative Hold is a simpler data structure than multiple Speculative Back-References.

The resulting Back-Reference KVT 1210 for a chunk will occupy slightly less disk space, and considerably reduces the worst case disk space requirement.

It will, however, result in delaying the earliest possible expunge of an unneeded chunk which could slightly reduce the space utilization of the storage cluster.

Namespace Manifest Resharding

An implementation will find it desirable to allow the sharding of an existing Namespace to be refined by either splitting a namespace manifest shard into two or more namespace manifest shards, or by merging two or more namespace shards into one namespace manifest shard. It is desirable to split a shard when there are an excessive records assigned to it, while it is desirable to merge shards when one or more of them have too few records to justify continued separate existence.

When an explicit Version Manifest has been created for a Namespace Manifest, splitting a shard is accomplished as follows:

As shown in FIGS. 10A and 10B, the Put Update request instructs the system to split a particular shard by using a modifier to request creating a second chunk with the records assigned to a new shard. In FIG. 10A, four exemplary shards are shown (M shards). If the current shard is N of M (e.g., shard 3 of 4) and the system is instructed to split the shard, the new shards, shown in FIG. 10B, will be N*2 of M*2 (e.g., shard 6 of 8) and N*2+1 of M*2 (e.g., shard 7 of 8), and shard N (e.g., shard 3) will cease to exist. The shards that are not splitting will retain their original numbering (i.e. non-N of M) (e.g., shards 1, 2, and 4 of 16).

As each targeted server creates its modified chunk, it will attempt to create the split chunk in the Negotiating Group assigned for the new shard (N*2+1 of M*2). Each will attempt to create the same new chunk, which will result in N−1 returns reporting that the chunk already exists. Both CHITs of the new chunks are reported back for inclusion of the new Version Manifest.

Figures 11A, 11B:
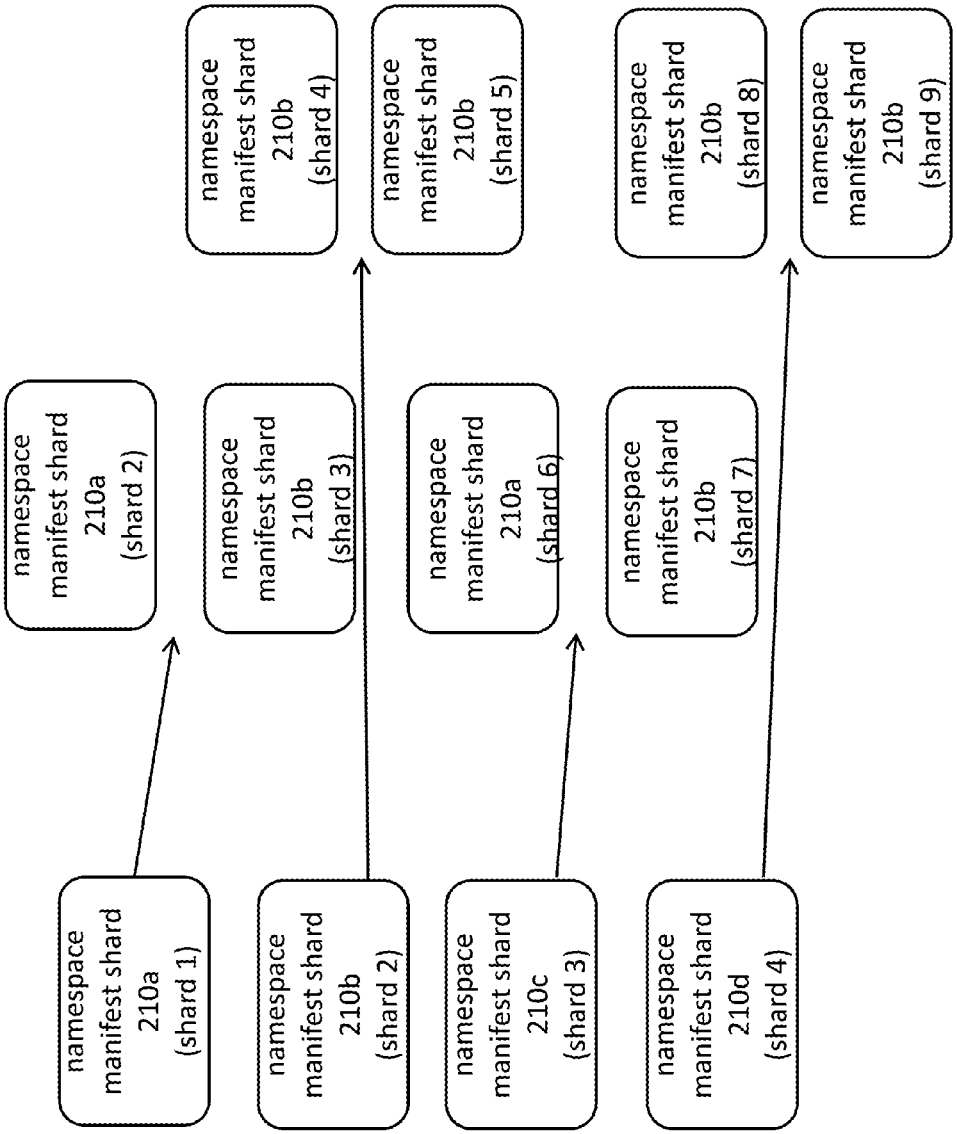
FIGS. 11A and 11B show the splitting of all namespace manifest shards.

When operating without an explicit Version Manifest it is necessary to split all shards at once. This is done as follows and as shown in FIGS. 11A and 11B:

The policy object is changed so that the desired sharding is now M*2 rather than M (e.g., 8 shards instead of 4).

Until this process completes, new records that are to be assigned to shard N*2+1 (e.g., shard 7 when N=3) of M will also be dispatched to shard N*2 of M (e.g., shard 6).

A final instruct to each shard to split its current chunk with a Put Update request inserting no new records but requesting the spit to shard N*2 of M*2 and N*2+1 of M*2. This will result in many redundant records being delivered to the new "odd" shards, but splitting of Namespace Shards will be a relatively rare occurrence. After all, anything that doubled in capacity frequently on a sustained basis would soon consume all the matter in the solar system.

Redundant dispatching of "odd" new records is halted, resuming normal operations.

While relatively rare, the total number of records in a sharded object may decrease, eventually reaching a new version which would merge two prior shards into a single shard for the new version. For example, shards 72 and 73 of 128 could be merged to a single shard, which would be 36 of 64.

The put request specifying the new shard would list both 72/128 and 73/128 as providing the pre-edit records for the new chunk. The targets holding 72/128 would create a new chunk encoding shard 36 of 64 by merging the retained records of 72/128, 73/128 and the new delta supplied in the transaction.

Because this put operation will require fetching the current content of 73/128, it will take longer than a typical put transaction. However such merge transactions would be sufficiently rare and not have a significant impact on overall transaction performance.

Namespace manifest gets updated as a result of creating and expunging (deleting) version manifests. Those skilled in the art will recognize that the techniques and methods described herein apply to the put transaction that creates new version manifests as well as to the delete transaction that expunges version manifests. While specific embodiments of, and examples for, the invention are described herein for illustrative purposes, various equivalent modifications are possible within the scope of the invention. These modifications may be made to the invention in light of the above detailed description.

What is claimed is:

1. A method for a storage server within an object storage system to process a put transaction for a new version of an object associated with a new version manifest chunk, wherein the storage server contains an old version of the object associated with an old version manifest chunk, the method comprising:
    validating the new version manifest chunk;
    saving the new version manifest chunk to persistent storage;
    comparing a unique version identifier for the new version manifest with a unique version identifier for the old version manifest stored in a local name index and updating a local name index for the object's name if the unique version identifier for the new version manifest is more current than the unique version identifier for the old version manifest stored in the local name index;
    creating an entry in the storage server's local transaction log recording the existence of the new version manifest;
    sending an acknowledgement message for the put transaction; and
    asynchronously processing the entry to update one or more namespace manifests of the object storage system;
    wherein each transaction log entry specifying creation or deletion of version manifests is mapped into records to be distributed to namespace manifests, wherein the mapped records comprise inclusive mapped records and iterative mapped records; and
    wherein the inclusive mapped records each comprises type, enclosing directory name, the remaining portion of the fully qualified object name which is not part of the enclosing directory name, unique version identifier, and cryptographic hash identifying token of the version manifest, wherein the type comprises data indicating a version manifest exists or data indicating a version manifest does not exist.

2. A method for a storage server within an object storage system to process a put transaction for a new version of an object associated with a new version manifest chunk, wherein the storage server contains an old version of the object associated with an old version manifest chunk, the method comprising:
    validating the new version manifest chunk;
    saving the new version manifest chunk to persistent storage;
    comparing a unique version identifier for the new version manifest with a unique version identifier for the old version manifest stored in a local name index and updating a local name index for the object's name if the unique version identifier for the new version manifest is more current than the unique version identifier for the old version manifest stored in the local name index;
    creating an entry in the storage server's local transaction log recording the existence of the new version manifest;
    sending an acknowledgement message for the put transaction; and
    asynchronously processing the entry to update one or more namespace manifests of the object storage system;
    wherein each transaction log entry specifying creation or deletion of version manifests is mapped into records to be distributed to namespace manifests, wherein the mapped records comprise inclusive mapped records and iterative mapped records; and
    wherein each iterative mapped record comprises type, enclosing directory name, and the immediate subdirectory name relative to the enclosing directory.

3. A method for a storage server within an object storage system to process a put transaction for a new version of an object associated with a new version manifest chunk, wherein the storage server contains an old version of the object associated with an old version manifest chunk, the method comprising:
    validating the new version manifest chunk;
    saving the new version manifest chunk to persistent storage;
    comparing a unique version identifier for the new version manifest with a unique version identifier for the old version manifest stored in a local name index and updating a local name index for the object's name if the unique version identifier for the new version manifest is more current than the unique version identifier for the old version manifest stored in the local name index;
    creating an entry in the storage server's local transaction log recording the existence of the new version manifest;
    sending an acknowledgement message for the put transaction; and
    asynchronously processing the entry to update one or more namespace manifests of the object storage system;
    wherein each transaction log entry specifying creation or deletion of version manifests is mapped into records to be distributed to namespace manifests, wherein the mapped records comprise inclusive mapped records and iterative mapped records; and
    wherein each mapped record is assigned to a specific namespace manifest by a configuration rule assigning subsets of the entire namespace to specific namespace manifests, and to a specific shard of that namespace manifest, by the cryptographic hash of the enclosing path name.

4. The method of claim 3, wherein each of the mapped records assigned to a batch based upon its assigned namespace shard; and wherein the collected batches are eventually dispatched to and merged with a target namespace shard.

5. The method of claim 4, wherein the storage server that stores a namespace shard performs the merge of the batches of mapped records to create a new chunk for the namespace shard.

6. The method of claim 4, wherein each transaction log entry specifying creation or deletion of version manifests is mapped into back-reference edit records to be distributed to storage servers, wherein the back-reference edit records comprise:
- the content hash identifying token (CHIT) of the referenced chunk;
- the CHIT of the referencing manifest; and
- the effective replication count required of this chunk by the referencing manifest, wherein an effective replication count of zero indicates that the chunk is no longer required by this referencing manifest.

7. The method of claim 6, wherein each storage server assigns the generated back-reference edit records to a corresponding target Negotiating Group and dispatches the resulting batch of back-reference edit records to the target Negotiating Group.

* * * * *